(12) United States Patent
Tapson

(10) Patent No.: US 7,609,850 B2
(45) Date of Patent: Oct. 27, 2009

(54) DATA PROCESSING APPARATUS AND METHOD

(75) Inventor: Daniel Warren Tapson, London (GB)

(73) Assignee: Sony United Kingdom Limited, Weybridge (GB)

(*) Notice: Subject to any disclaimer, the term of this patent is extended or adjusted under 35 U.S.C. 154(b) by 632 days.

(21) Appl. No.: 11/296,797

(22) Filed: Dec. 7, 2005

(65) Prior Publication Data

US 2006/0126892 A1      Jun. 15, 2006

(30) Foreign Application Priority Data

Dec. 9, 2004    (GB) ................. 0427024.5

(51) Int. Cl.
*G06K 9/00* (2006.01)

(52) U.S. Cl. .................... 382/100; 713/176

(58) Field of Classification Search ........... 382/100, 382/232; 380/54, 210, 252; 713/176; 348/460, 348/463; 381/73.1; 704/200.1, 273
See application file for complete search history.

(56) References Cited

U.S. PATENT DOCUMENTS

| | | | | |
|---|---|---|---|---|
| 5,946,414 A | * | 8/1999 | Cass et al. ............. | 382/183 |
| 5,960,081 A | * | 9/1999 | Vynne et al. ........... | 713/176 |
| 6,285,774 B1 | * | 9/2001 | Schumann et al. ...... | 382/100 |
| 2004/0001626 A1 | | 1/2004 | Baudry et al. | |
| 2006/0167784 A1 | * | 7/2006 | Hoffberg ................ | 705/37 |

FOREIGN PATENT DOCUMENTS

| | | |
|---|---|---|
| EP | 1 286 305 | 2/2003 |
| EP | 1 378 860 | 1/2004 |

* cited by examiner

*Primary Examiner*—Anand Bhatnagar
(74) *Attorney, Agent, or Firm*—Oblon, Spivak, McClelland, Maier & Neustadt, L.L.P.

(57) ABSTRACT

A data processing apparatus includes a registration processor that divides a frame of a water marked image into a plurality of image blocks. For each of the image blocks, an observed probability of possible distortion vectors representing shifts of the image block with respect to positions of the block in the original version of the image is estimated. For each of the image blocks, forward and backward probability distribution estimates of possible distortion vectors within the image block are generated recursively from the respective observed probability of distortion vectors for the image block and forward and backward probability distribution estimates determined respectively from previous and subsequent image blocks for a predetermined path through the blocks. For each image block, the forward and backward probability distribution estimates and the observed probability of distortion vector are combined to form a most likely distortion vector estimate.

15 Claims, 8 Drawing Sheets

DATA PROCESSING APPARATUS AND METHOD

FIELD OF INVENTION

The present invention relates to data processing apparatus and methods for detecting at least one of a set of code words, which has been embedded in a water marked image.

BACKGROUND OF THE INVENTION

Generally, a technique for embedding data in material to the effect that the embedded data is perceptible or imperceptible in the material is referred to as water marking. Code words are applied to versions of material items for the purpose of identifying the version of the material item or for conveying data represented by the code words. In some applications, water marking can provide, therefore, a facility for identifying a particular version of the material.

A process in which information is embedded in material for the purpose of identifying a specific version of the material is referred to as finger printing. A code word, which identifies the material, is combined with the material in such a way that, as far as possible, the code word is imperceptible in the material. As such, if the material is copied or used in a way, which is inconsistent with the wishes of the owner, distributor or other rights holder of the material, the material version can be identified from the code word and take appropriate action.

In order to detect a code word in a marked material item, it is known to recover an estimate of the code word from the marked material item and to identify the code word by correlating each of a possible set of code words with the estimated code word. The code word is detected by comparing a result of the correlation with a predetermined threshold. If the correlation result exceeds the threshold then the code word of the set, which generated the correlation result, is considered to have been detected. Thus by detecting the code word, payload data, which is represented by the code word, can be recovered. Typically, in order to recover the estimated code word from the marked material, a copy of the original version of the material item is subtracted from the suspected marked material item.

In applications of finger printing to cinema, a water marked copy of a cinema image is displayed on a cinema screen. If a cinema film is then copied using, for example a hand-held video camera, to make a pirate copy, then the pirate copy can be identified, by detecting the code word, which will also be present in the pirate copy. Typically, the pirate copy of the film may suffer some distortion, either as a result of copying or as a result of processing performed on the pirate copy. For example, the original image may be distorted as a result of an angle of the video camera producing the copy with respect to the cinema screen. If the marked image is distorted in the pirate copy, then a likelihood of correctly detecting a code word, which is present in the image may be reduced. It is therefore known to register the marked image with respect to an original copy of the image so that when the original is subtracted from the registered marked copy, a code word present in the marked image will be closer to an original form of the code word. A likelihood of not detecting a code word which is present in the marked image (false negative detection probability) is thereby reduced.

The term register is used to refer to a process in which distortion is, as far as possible, removed from an image and aligned with a copy of the original image.

SUMMARY OF INVENTION

An object of the present invention is to provide an improved likelihood of correctly detecting a code word which is present in a water marked image.

Another object of the present invention is to reduce distortion more accurately from the marked image.

According to the present invention there is provided a data processing apparatus for detecting at least one of a set of code words which has been embedded in a water marked image. The apparatus comprises a registration processor operable to register the water marked image and an original version of the image with respect to one another, and a detection processor. The detection processor is operable to recover an estimate of the code word from the water marked image by comparing the registered water marked image with the original version of the image, and to detect the code word by correlating each of the code words of the set with the estimated code word. The registration processor includes an image analyser operable to divide the water marked image into a plurality of image blocks, a distortion vector probability estimator, a forward probability estimator and a backward probability estimator. The distortion vector probability estimator is operable to estimate for each of the image blocks of the water marked image an observed probability of possible distortion vectors representing shifts of the image block with respect to positions of the block in the original version of the image. The forward probability estimator is operable for each of the image blocks to generate an estimate of a forward probability distribution of possible distortion vectors within the image block recursively from the observed probability of distortion vectors for the image block and forward probability distribution estimates determined from previous image blocks for a predetermined path through the blocks. The backward probability estimator is operable for each of the image blocks to generate an estimate of a backward probability distribution of possible distortion vectors within the image block recursively from the observed probability of distortion vectors for the image block and backward probability distribution estimates determined from subsequent image blocks for the predetermined pattern. The data processing apparatus also includes a combining engine and an inverse distortion engine. The combining engine is operable to combine for each image block the forward probability distribution estimate, the backward probability distribution estimate and the observed probability of distortion vector to form a most likely distortion vector estimate. The combining engine forms a map of distortion vectors from the most likely distortion vector estimate for each image block. The inverse distortion engine is operable to apply a reverse of the most likely distortion vector for each image block by re-sampling the image to register the water marked image with the original image to improve a likelihood of correctly detecting the water mark code word.

The data processing apparatus according to embodiments of the present invention is provided with an improved likelihood of correctly detecting a code word which is present in a water marked image, because the registration processor is able to reduce distortion more accurately from the marked image. The distortion is reduced with reference to the original version of the image to an effect that the original version and the water marked image can be more accurately aligned. Hence the code word can be recovered with a greater likelihood that the coefficients of the code word will be in their original form or at least closer to their original form.

Embodiments of the invention can provide therefore a registration processor for reducing distortion and improving an alignment of a water marked image with an original version of the image. The improvement is provided by dividing the image into image blocks and applying a premise that the distortion experienced by one block will have a high probability of changing by a relatively small amount from previous blocks and from subsequent blocks. The registration processor utilises forward and backward probability estimates for each image block, which are determined from distortion vector estimates from previous and subsequent image blocks along a predetermined path through the image blocks respectively. The predetermined path may be for example a row or a column or some arbitrary path though the image blocks. The forward and backward probability distribution estimates provide a probability distribution of possible distortion vectors within an image block. The probability estimates represent a two dimensional distribution of probabilities of distortion vectors which could have been applied to the image block to distort the image block with respect to the image block in the original image.

As will be explained with reference to example embodiments, a forward probability distribution of possible distortion vectors is generated from previous image blocks and a backward probability distribution of possible distortion vectors is generated from subsequent image blocks. A most likely distortion vector estimate is calculated from a combination of the forward and backward probability distributions with an observed probability distribution of possible distortion vectors for a current image block. From the most likely distortion vectors for each block a map of distortion vectors is formed for a water marked image frame. In some embodiments the inverse distortion engine forms a modelling function which best fits or matches the distortion map. The modelling function is then used to reduce distortion in the marked image frame by re-sampling the image frame to the effect of inverting or reversing the modelling function.

The data processing apparatus according to some embodiments of the present invention may arranged to form a second pass for refining the calculation of the distortion vector estimate for each image block. In such embodiments the predetermined pattern may comprise first and second predetermined patterns and the forward and backward probability distribution estimators may be first forward and backward probability distribution estimators, the apparatus comprising second forward and second backward probability distribution estimators. The second forward probability estimator may be operable for each of the image blocks to generate a second estimate of the forward probability distribution of possible distortion vectors within each image block from the distortion vectors for the image block and the forward probability distribution estimates determined from previous image blocks for the second predetermined path through the blocks. The second backward probability distribution estimator may be operable for each of the image blocks to generate a second estimate of a backward probability distribution of possible distortion vectors within each image block from the distortion vectors for the image block and the backward probability distribution estimates determined from subsequent image blocks for the second predetermined pattern. The combining engine may be operable to combine the second forward probability distribution estimates, with the second backward probability distribution estimates and the most likely distortion vectors to form a refined distortion probability map providing a refinement of the most likely distortion vectors. As a result, the inverse distortion engine may be operable to apply a reverse of the refined most likely distortion vector for each image block to provide an improvement in a reduction of the distortion to register the water marked image with the original image.

In some embodiments the forward probability estimate and the backward probability distribution estimate may be filtered so that the probability distribution of distortion estimates are convolved with a predetermined probability distribution, for example a Gaussian distribution. An effect of convolving the forward and backward probability estimates with the Gaussian distribution is to modify the forward or backward probability distribution so that a likelihood of a change in the distortion vector for the forward and backward directions from one image block to the next is biased in accordance with the Gaussian distribution. As such an improvement can be provided in the accuracy with which distortion is estimated.

Various further aspects and features of the present invention are defined in the appended claims. These aspects include a method of detecting code words in a water marked image, a method of registering a distorted version of an image and a registration processor.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

Water Mark Encoder

Figure 1:
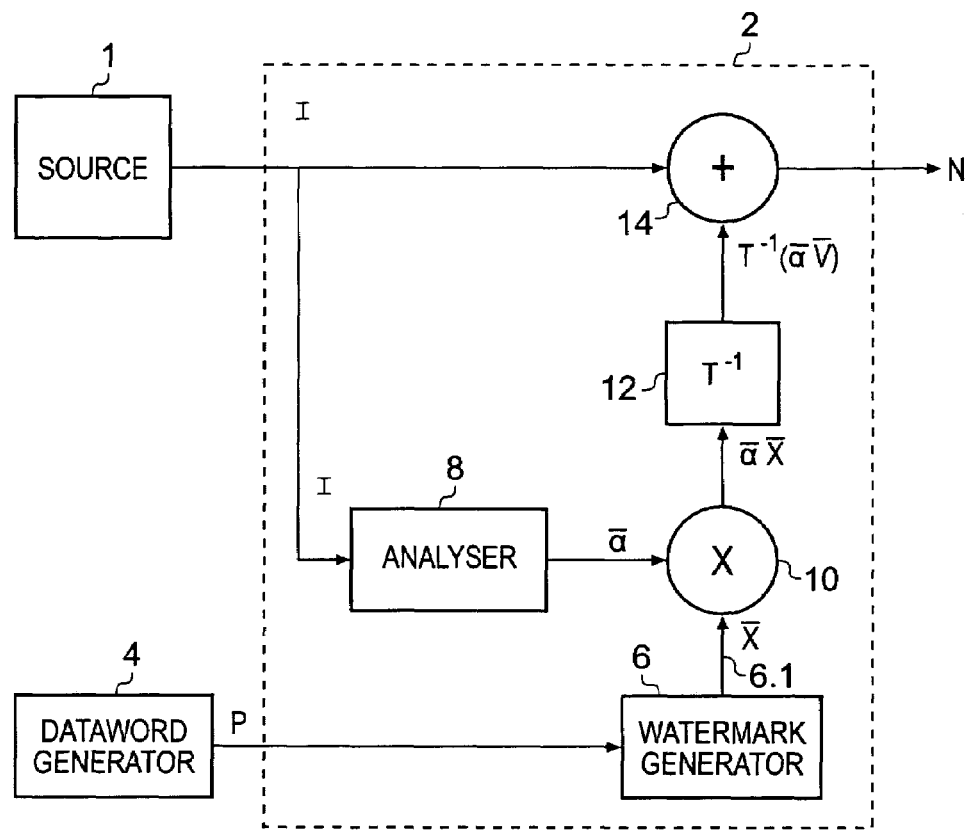
FIG. 1 is a schematic block diagram of an encoding apparatus for combining an image with a code word.
Figure 2:
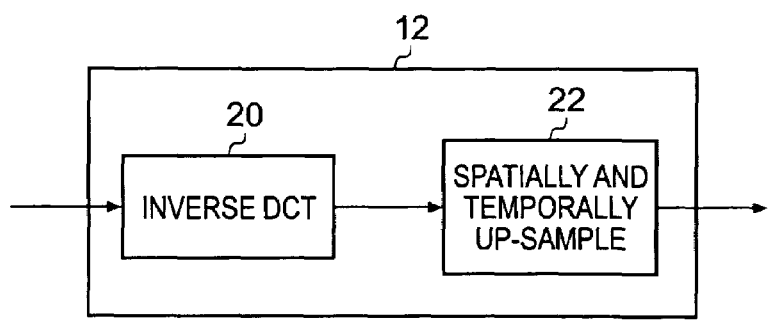
FIG. 2 is a schematic block diagram of an inverse transform processor forming part of the apparatus shown in FIG. 1.

An encoding data processing apparatus, which is operable to generate water marked images by combining a code word with the images, is shown in FIG. 1. The encoding data processing apparatus shown in FIG. 1 is arranged to combine the code word with the image to form the marked copy in a base band domain of the original image. In FIG. 1 images I are generated by a source 1 and fed to an encoder 2 which is arranged to combine payload data words P generated by a data word generator 4 so that at the output of the encoder 2 a marked copy W of the images I is formed. The encoder 2 shown in FIG. 1 includes a code word generator 6 which arranges the code word coefficients into a form corresponding to a transform domain representation of the image. Weighting factors are then generated by a perceptual analyser 8 in accordance with a relative ability of the image to carry the code word coefficients with a maximum strength whilst minimising a risk of the code word being perceivable when added to the image L The weighting factors are received by a strength adaptor 10 and combined with the code word coefficients to form weighted code word coefficients. The weighted code word coefficients are then transformed into the base band domain by an inverse transform processor 12, which performs an inverse transform on the code word. The base-band domain code word is then combined with the base band domain image by a combiner 14 to form the marked copy of the image W.

In the following description the term "samples" will be used to refer to discrete samples from which an image is comprised. The samples may be luminance samples of the image, which is otherwise, produce from the image pixels. Therefore, where appropriate the term samples and pixels are inter-changeable.

Video images are one example of material, which can be protected by embedding a digital code word. Other examples of material, which can be protected by embedding a code word, include software programs, digital documents, music, audio signals and any other information-bearing signal.

In some embodiments utilising the present technique, the transform domain representation of the code word may include a Discrete Cosine Transform (DCT), a Fourier Transform or a Discrete Wavelet Transform. For example, the code word could be formed as if in a DCT domain, so that the inverse transform processor 12 may be arranged to perform an inverse DCT on the code word coefficients before being spatially and/or temporally up-sampled. Accordingly the code word may be spread more evenly across the frequency band of the image.

According to one example of the present technique, the transform domain representation includes either a temporal and/or spatial down-sampled representation with respect to a sampling rate of the base band domain image. The code word is therefore arranged in a form or treated as if the code word were in a form in which it had been spatially and/or temporally down-sampled with respect to the base band version. As such the inverse transform processor is arranged to temporally and/or spatially up-sample the code word coefficients to form a base band version of the code word, in which form the code word is combined with the base band image I to form the marked copy of the image W.

Figure 3:
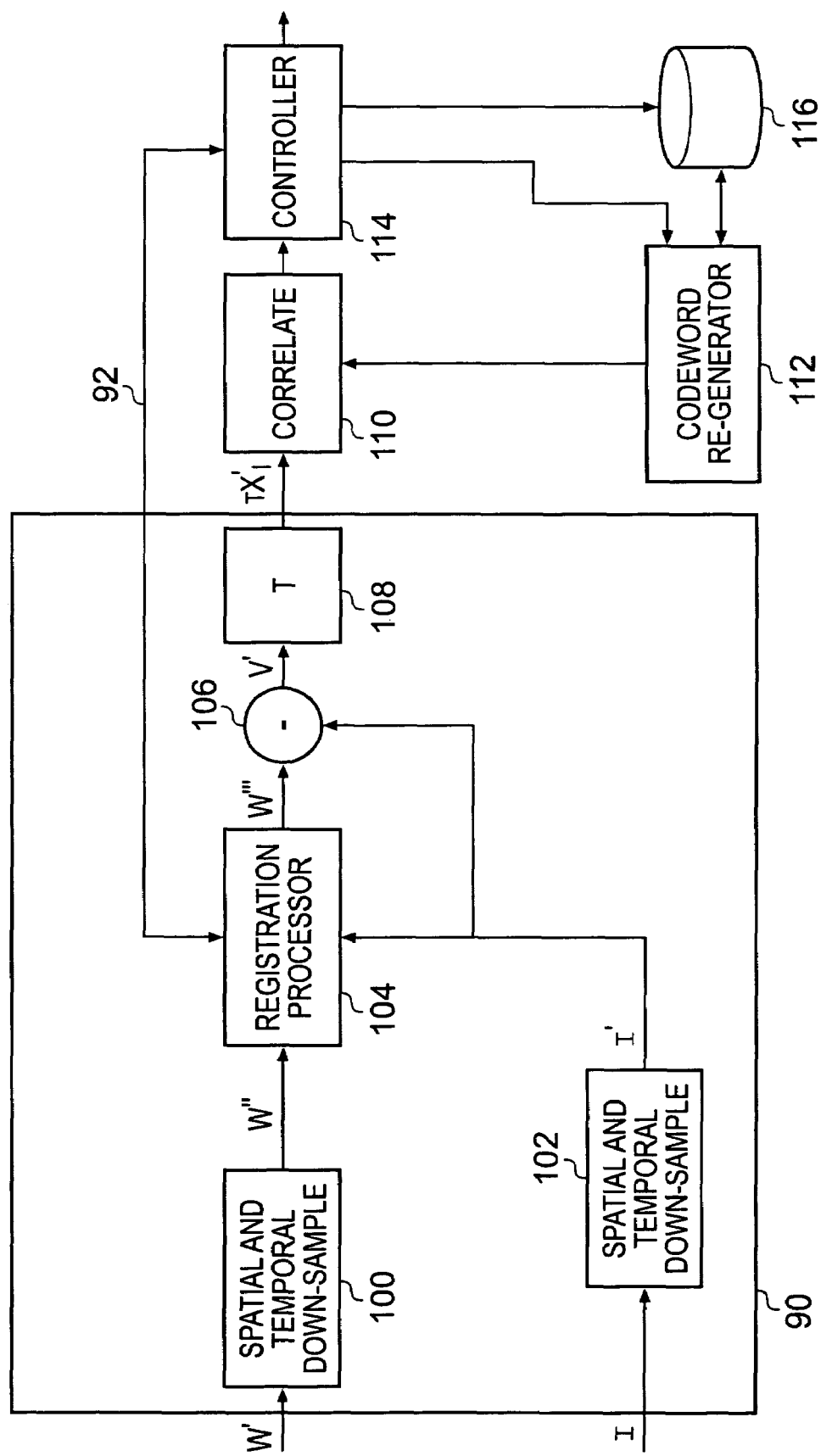
FIG. 3 is a schematic block diagram of a detecting data processing apparatus for detecting code words present in marked copies of images.

An example of an inverse transform processor 12 is shown in FIG. 3 in more detail. As shown in FIG. 3, the inverse transform processor 12 includes an inverse DCT transformer 20 which performs an inverse DCT on the down-sampled code word as formed into a DCT domain image. An up-sampling processor 22 is then operable to spatially and/or temporally up-samples the code word to provide a sampling rate which corresponds to that of the base band domain image.

Detecting Processor

A detecting apparatus, which is arranged to detect code words and to recover a payload data word if present in the material item is shown in FIG. 3. In FIG. 3 an offending version of the water marked image W' and a copy of the original image I are received in a recovery processor 90.

Figure 4:
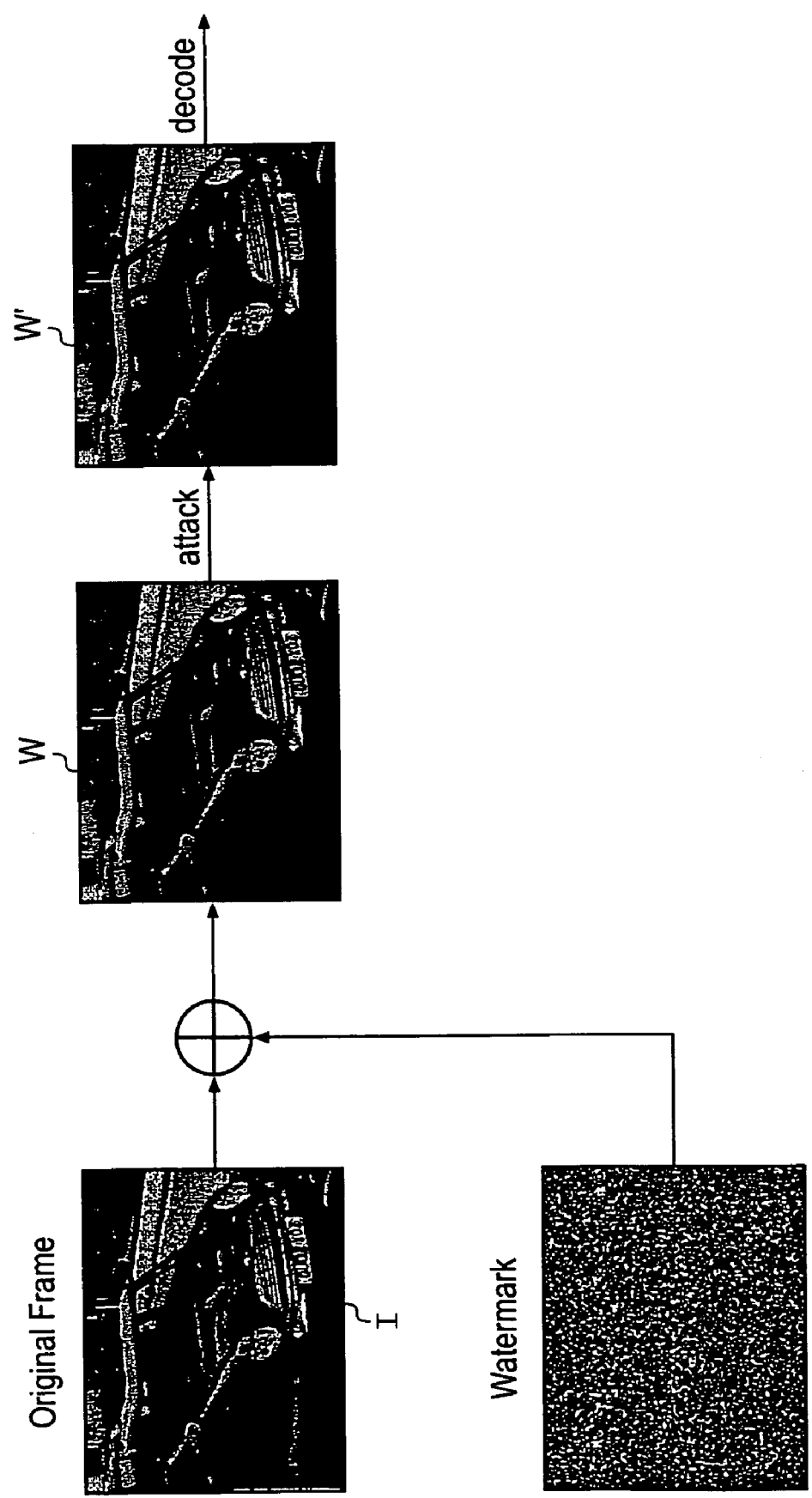
FIG. 4 is an example illustration of an original image with a water marked version of the image which has been distorted, and from which the distortion should be removed to detect the code word present in the marked image.

FIG. 4 provides an example illustration of a technical problem which the detecting apparatus is required to ameliorate in order to detect a code word in the water marked image W'. As shown in FIG. 4, a water marked image W is formed by combining a water mark code word X with a copy of the original image L Distortion may be applied to the water marked image either deliberately by an attacker aiming to disrupt the water marking system or at a time of copying of the water marked image. As a result a distorted version of the water marked image W' is formed, from which the code word embedded in the image must be detected in order to identify the water marked image.

Within the recovery processor 90, the marked image is received at a first down-sampling processor 100. The copy of the original image I is fed to a second down-sampling processor 102. The first and second down-sampling processors 100, 102 each spatially and temporally down sample the received images W' I to form reduced resolution versions. The reduced resolution versions correspond to the down-sampled version with respect to which the code word was formed in the transform domain, when embedded in the image I in the encoding data processor.

The recovery processor 90 is arranged to process the marked image and the original image and to form an estimate of a code word, which may have been embedded in the marked image. For the example shown in FIG. 4, the recovery processor 90 also includes a registration processor 104, a comparator 106 and a transform processor 108.

As shown in FIG. 3, the offending version of the marked image W' may have been produced by photographing or otherwise reproducing a part of the water marked image W' As such, in order to improve the likelihood of detecting the identification code word, the registration processor 104 is arranged to receive the down-sampled version of the image I' and the suspected marked copy W'' and to align substantially the offending image with the original version of the image. The purpose of this alignment is to provide a correspondence between the down-sampled original image samples I' and the corresponding samples of the down-sampled water marked image W'' to which the code word coefficients have been added, thereby increasing a likelihood of correctly detecting a code word, or reducing the false negative detection. According to some implementations a confidence in a relative alignment performed by the registration processor is provided to a control processor 114 via a control channel 92, which can be used therefore to influence a decision as to whether or not a code word is detected in the received marked image.

The registered marked image W''' is received by the comparator 106 also forming part of the recovery processor 90. The comparator 106 also receives a copy of the down-sampled original image I' and proceeds to subtract the samples of the original image I' from the registered water marked image W'''. Since the water mark code word was embedded into the image I' in the spatial domain there is no requirement to transform the image into the frequency domain to recover an estimate of the water mark code word V'. The estimate of the code word V' in the spatial domain is then fed to the transform processor 108 which forms an estimate of the code word by performing a DCT on the reduced resolution samples to form an estimated code word X'.

The output of the transform processor 108 therefore provides an estimate of the coefficients of the code word, which is to be identified. The recovered code word X' is then fed to a first input of a correlator 110. The correlator 110 also receives on a second input a re-generated code words $X^i$ produced by the code word generator 112. The code word generator 112 operates to reproduce code words under the control of a control processor 114. The control processor 114 therefore has access to a data store 116, which stores seeds and keys for generating the water mark code words. The control processor 114 controls the correlator 110 and the code word re-generator to correlate, with the estimated code word, each of the code words in the set of possible code words, which may have been embedded in the image. If a result of the correlation exceeds a predetermined threshold then the control processor 114 determines that the code word was present in the water marked image.

Registration Processor

Figure 5:
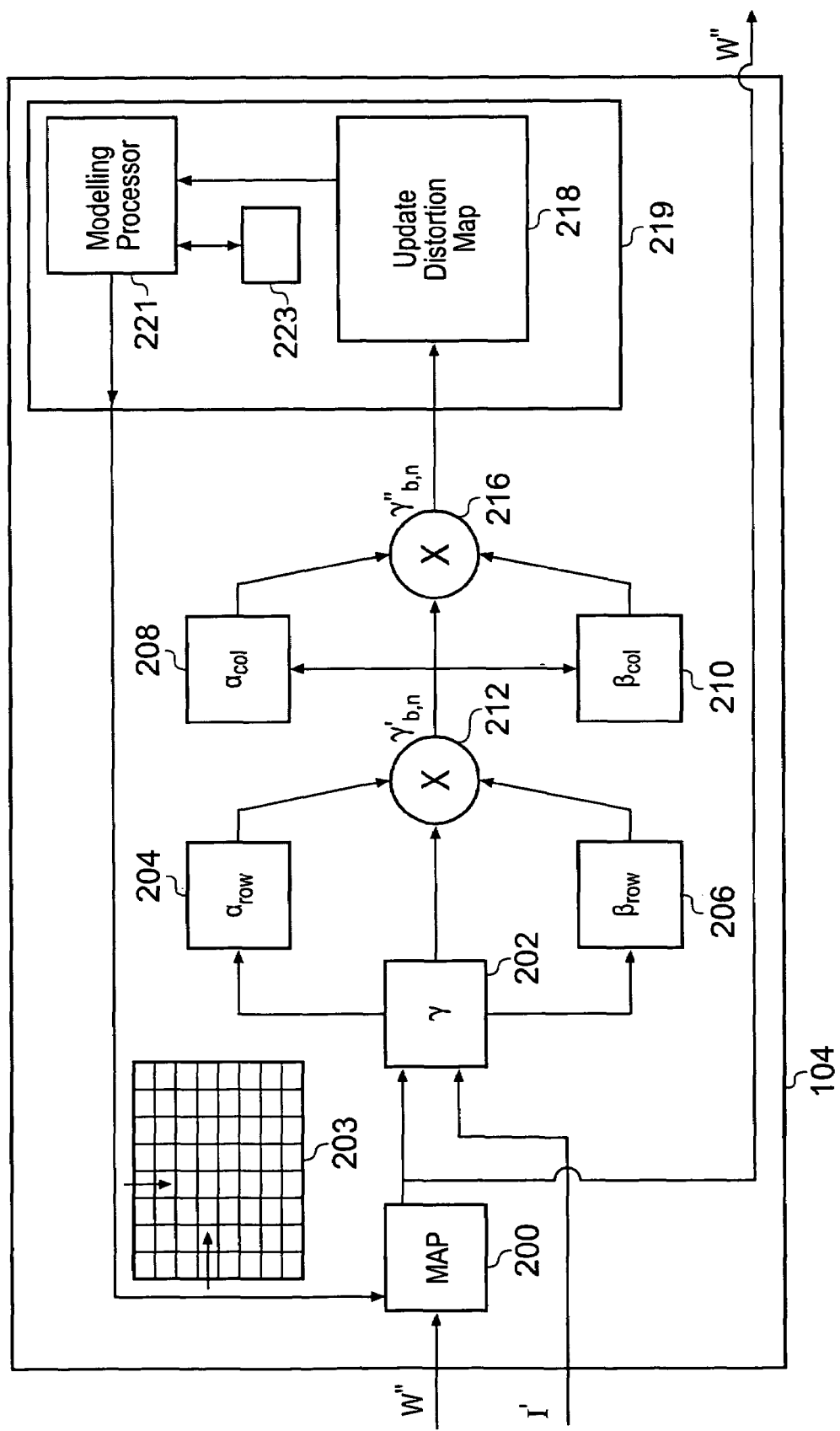
FIG. 5 is a schematic block diagram of a registration processor, which appears in FIG. 3, which registers a marked image with a copy of the original image.

A more detailed illustration of the registration processor 104 shown in FIG. 3 is provided in FIG. 5. Generally, the registration processor 104, determines a most likely distortion vector for each of a plurality of image blocks with an image frame, from which a map of distortion vectors is formed for the frame. A function which best fits the observed map of distortion vectors is then determined. The function provides a model of the observed distortion. The modelling function can then be used to re-sample the image frame to the effect of substantially reducing the distortion by applying a reverse of the modelling function. In FIG. 5 the water marked image is received by an image analyser 200 which divides the water marked image into image blocks of for example 4×4 pixels. Thus, each frame of the water marked image is divided into a set of image blocks each comprising 4×4 pixels. The image analyser 200 having divided the image into 4×4 image blocks provides an image frame as illustrated as a divided image frame 203. Each of the image blocks is then passed to a distortion vector estimator 202.

The distortion vector estimator 202 generates, for each image block n in a row r and a column c for a motion vector b, an observed probability distribution of distortion vectors $\gamma_{b,n}$. The observed probability distribution of distortion vectors for each block represents a likelihood of possible shifts of the image block within the water marked image frame W" with respect to a position of the block in the original version of the image received from the down-sampler 102. Thus, each image block in the water marked image is correlated with corresponding positions within the copy of the original image I. The correlation may be performed by matching the blocks, forming a sum of differences for each possible shift corresponding to a possible distortion vector from which a probability of that shift occurring can be calculated. The block matching could be cross-correlation, phase correlation, mean absolute difference or another form of block matching. From the correlation a relative observed probability of possible distortion vectors is therefore determined representing a motion vector b corresponding to a shift of the image block n with respect to the corresponding block in the original image. The observed probability distribution of distortion vectors $\gamma_{b,n}$ are then processed by a forward probability estimator 204 and a backward probability estimator 206.

As will be explained the distortion vectors are processed according to a predetermined pattern to the effect of calculating for each image block a forward probability distribution estimate of possible distortion vectors and a backward probability distribution estimate of possible distortion vectors depending upon previous and subsequent estimates of the forward and backward probability estimates respectively. For the example embodiment illustrated in FIG. 5, the predetermined pattern is such that the image blocks are processed in rows and subsequently processed as columns. Thus a two-pass estimate performed with the effect that a probability of distortion vectors in each image block is determined after processing the image blocks in rows and then refined probability distortion vectors are formed after processing the image blocks in columns. However in other embodiments, other predetermined patterns may be used and only a single pass may be used to generate the most likely distortion vector for each block.

The observed distortion vectors $\gamma_{b,n}$ for the image blocks are then communicated to a forward probability estimator 204 and a backward probability estimator 206. As will be explained in more detail in the following paragraphs, the forward probability estimator generates a probability distribution estimate of possible distortion vectors within each of the image blocks. The forward probability distribution estimates are calculated from previously calculated probability estimates from image blocks, which have already been calculated for previous image blocks in each row, moving forward along the row. For each block in the row, the observed distortion vector $\gamma_{b,n}$ calculated by the distortion vector estimator is combined with the currently determined forward probability estimate which has been calculated from previous image blocks moving along the row. The forward probability estimates are therefore calculated recursively from previous blocks in the row. This can perhaps be better understood from the diagram in FIG. 6.

Figure 6:
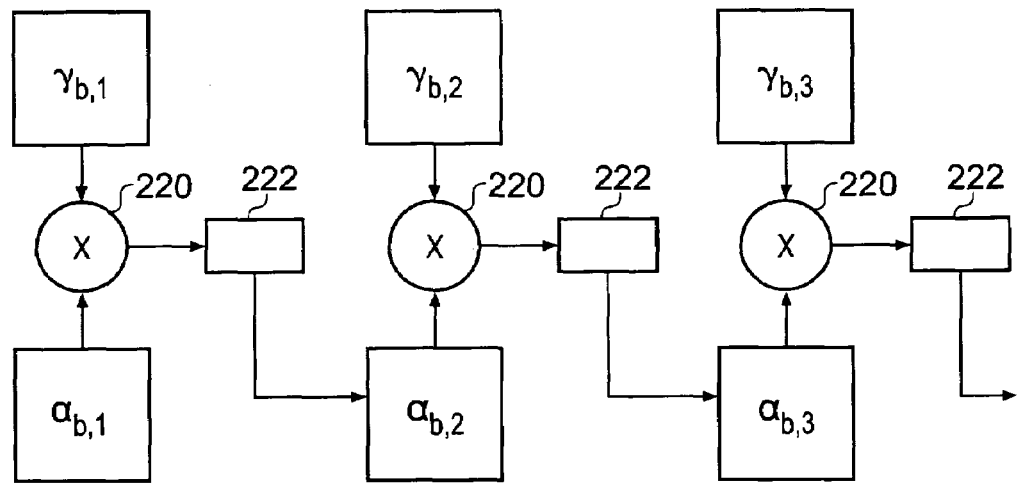
FIG. 6 is a schematic block diagram of a forward probability estimator as shown in FIG. 5.

FIG. 6 provides a schematic illustration of an example operation of the forward probability estimator 204, in which the first three forward probability distortion vectors are calculated recursively for the first three image blocks. As illustrated the forward probability estimates $\alpha_{b,1}$, $\alpha_{b,2}$ and $\alpha_{b,3}$ are calculated from corresponding distortion vector estimates determined for the first three blocks in a row of the image $\gamma_{b,1}$, $\gamma_{b,2}$ and $\gamma_{b,3}$. As shown in FIG. 6, each of the forward probability estimates is calculated recursively from the probability estimate from the previous image block in the row. Thus for example, the forward probability estimate for the second image block $\alpha_{b,2}$ is calculated by a multiplier 220 multiplying the distortion vector estimate $\gamma_{b,1}$ for the first image block with an estimate of the forward probability $\alpha_{b,1}$ for the first image block. Thereafter the subsequent forward probability estimate $\alpha_{b,n}$ is determined by multiplying the forward probability estimate $\alpha_{b,n-1}$ and the distortion vector estimate $\gamma_{b,n-1}$ for the image block of the previous image block in the row. As such, each of the forward probability distribution estimates is calculated recursively from probability distribution estimates from previous image blocks.

For the first image block in each row, the forward probability distortion estimate $\alpha_{b,1}$ is set so that the probability of each of the possible distortion vectors are equally likely.

As illustrated in FIG. 6, each forward probability estimate is passed through a transition filter, which convolves the forward probability estimate $\alpha_{b,n}$ with a probability distribution. The probability distribution is provided so that the forward probability estimate $\alpha_{b,n}$ is biased or modified in accordance with an expectation of how the distortion vectors are expected to change from one block to the next. In one example, the probability distribution is a Gaussian distribution. Effectively, the forward probability distribution is modulated with a two-dimensional Gaussian probability distribution thereby expressing the forward probability distribution of the distortion vectors with respect to an expected likelihood of that distortion vector changing from one block to the next.

Figure 7:
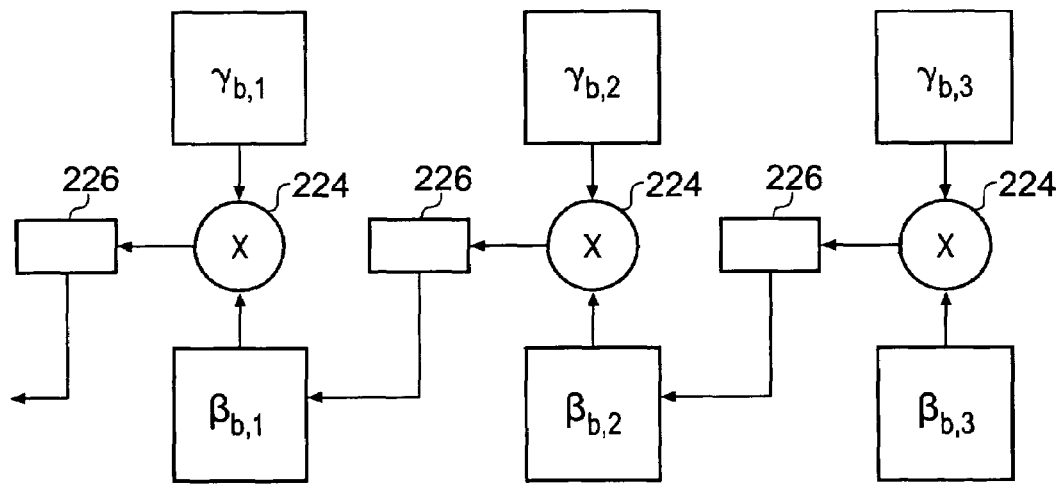
FIG. 7 is a schematic block diagram of a backward probability estimator as shown in FIG. 5.

A corresponding example illustrating the operation of the backward probability estimator 206 is provided in FIG. 7. The backward probability estimator 206 operates in a way which is similar to the operation of the forward probability estimator 204 shown in FIG. 6 except that each backward probability estimate $\beta_{b,n}$ is calculated recursively by a multiplier 224 multiplying the subsequent probability estimate $\beta_{b,n+1}$ for the subsequent block with the observed distortion vector estimate for the subsequent block $\gamma_{b,n+1}$. Thus, the backward probability estimator 206 works in a way, which corresponds to the forward probability estimator 204, except that each backward probability estimate is calculated recursively from subsequent distortion vector probability estimates. As with the forward probability estimator 204, each backward probability estimate is filtered with a probability distribution using a filter 226, which biases the estimate in accordance with a likelihood of that probability estimate occurring. Again, an example of a probability distribution is the Gaussian distribution.

For the last image block in each row, the backward probability distortion estimate $\beta_{b,L}$ is set so that the probability of each of the possible distortion vectors are equally likely.

As explained and illustrated in FIGS. 6 and 7, for each of the forward and backward distortion probability estimates a Gaussian probability distribution is applied by first and second Gaussian filters 208, 210. For each image block, the forward and backward probability distributions provide a two dimensional distribution of possible distortion vectors. An effect of filtering the forward and backward probability estimates is to bias the distortion vector value to a likelihood of that value occurring according to the Gaussian distribution. Effectively, the probability distribution is modulated with the two-dimensional Gaussian probability distribution thereby expressing the probability distribution of the distortion vectors with respect to a relative likelihood of that distortion vector occurring.

The following expressions define mathematically the calculations of the distortion vector estimates, the forward probability distortion estimates and the backward probability distortion estimates, where p( ) is the observed probability of a vector $\phi_n$ for the observed probability $O_n$ for n-th block with a motion vector b:

| | |
|---|---|
| The probability estimate of a motion vector for block n being in a position b given only that block's correlation surface; | $\gamma_{b,n} = p(\phi_n = b\|O_n)$ |
| The probability estimate of a motion vector for block n being in a position b given that all the correlation surfaces of blocks to the "left" along the row (previous image blocks moving forward in time); | $\alpha_{b,n} = p(\phi_n = b\|O_{m<n})$ |
| The probability estimate of a motion vector for block n being in position b given all the correlation surfaces of blocks to the "right" along the row (subsequent image blocks moving backward in time) | $\beta_{b,n} = p(\phi_n = b\|O_{m>n})$ |
| The probability estimate of the motion vector for block n being in position b given all the correlation surfaces (final answer) | $\lambda_{b,n} = p(\phi_n = b\|O_{m-1,N}) \propto \alpha\beta\gamma$ |
| The probability of motion vector n being b given that the block to immediate lefts motion vector was definitely in position c (transition probability) | $t_{b,c} = p(\phi_n = b\|\phi_{n-1} = c)$ |

The observed probability distribution of distortion vectors $\gamma_{b,n}$ and the forward and backward probability distortions $\alpha_{b,n}$, $\beta_{b,n}$ are then combined by a combining engine 212 to form for each image block a most likely distortion vector value $\gamma_{b,n}'$ after the image blocks have been processed row-by-row. The combining engine 212 multiplies together the estimated distortion vector $\gamma_{b,n}$, the forward probability distribution $\alpha_{b,n}$, and the backward probability distribution $\beta_{b,n}$ to form a most likely estimate of distortion vectors $\gamma_{b,n}'$. The probabilities $\gamma_{b,n}'$ and $\gamma_{b,n}''$ are equivalent to the probability $\lambda_{b,n}$ in the above table.

Figure 8:
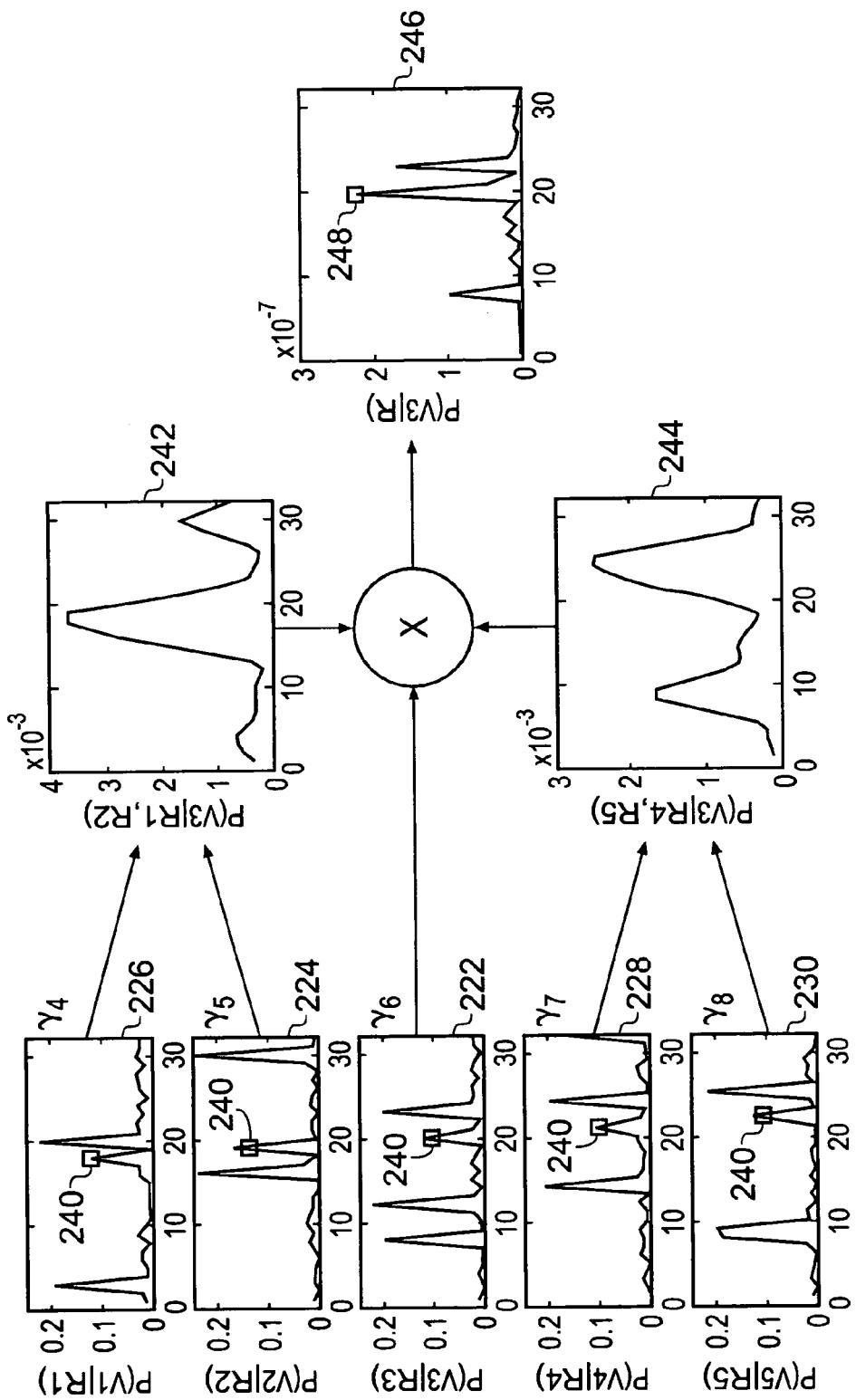
FIG. 8 is a schematic representation illustrating a part of the operation of the registration processor, which is shown in FIG. 5.

FIG. 8 provides an alternative illustration of the operation of the forward and backward probability estimators 204, 206. In FIG. 7 a probability distribution for likely distortion vectors within an image block is represented in a one dimension form for each of the image blocks 222, 224, 226, 228, 230 for respective observed probability distribution of distortion vectors $\gamma_4$, $\gamma_5$, $\gamma_6$, $\gamma_7$ and $\gamma_8$. As shown, each of the probability distributions for particular distortion vectors is graphically illustrated. The actual distortion vector for the image block is identified by a square 240 for each of the four image blocks 222, 224, 226, 228, 230. As will be observed from this example, the actual distortion vector 240 for each image block is not the highest probability distortion vector. However, the respective distortion vector estimates $\gamma_4$ and $\gamma_5$, $\gamma_7$ and $\gamma_8$ are combined to form forward and backward probability distributions 242, 244 as produced by the forward and backward probability estimators 204, 206. The forward and backward probability distribution estimates are then combined with the observed probability distribution of distortion vectors for the actual image block $\gamma_6$. As a result, the most likely distortion vector illustrated in the form of a one dimensional distribution 246 is produced which has a peak illustrated by a square 248. Therefore, it can be appreciated that according to the present technique the actual distortion vector is identified as the most likely distortion vector for the image block 222.

After likely distortion vector values $\gamma_{b,n}'$ have been formed by processing the image blocks of the image row-by-row, a refined most like estimate $\gamma_{b,n}''$ of the distortion vector values are formed by processing the image blocks column-by-column. As shown in FIG. 5 a second forward probability estimator 208 is provided to calculate refined forward probability estimates for each block by processing each column of the image blocks as the first forward probability estimator 204 processed the rows of image blocks. Correspondingly, a second backward probability estimator 210 is provided to calculate refined backward probability estimates for each block by processing each column of the image blocks. The second forward and backward probability estimators 208, 210 operate in a corresponding way to the first forward and backward probability estimators 204, 206 to calculate recursively forward and backward probability estimates from previous image blocks and subsequent image blocks in the columns of the image respectively. A second combiner 216 forms a refined most likely distortion probability estimate for each image block $\gamma_{b,n}''$ by multiplying the refined forward probability estimates $\alpha_{b,n}'$ and the refined backward probability estimates $\beta'_{b,n}$ together for each block.

As will be appreciated, in other embodiments, a further refined estimate of the distortion probability could be formed for each block, by calculating further refined estimates of the forward and backward probability estimates using a further predetermined pattern through the image blocks.

Figure 9:
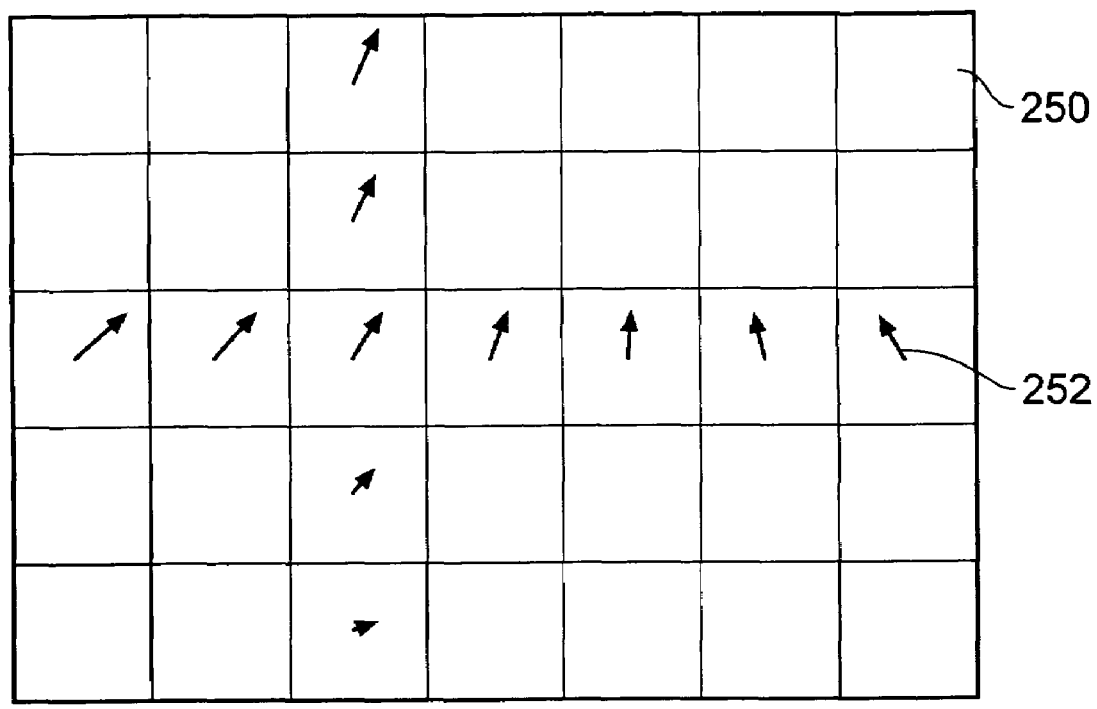
FIG. 9 is a schematic representation illustrating a map of distortion vectors, which is shown in FIG. 5.

After the refined estimate of the most likely distortion probability is formed for each image block, a distortion probability map is updated from the latest estimate of the most likely distortion vectors from each of the image blocks of an image frame. An illustration of such a map is provided in FIG. 9. The distortion probability map is formed and updated within a distortion map processor 218 within a distortion inversion engine 219. The distortion map is then fed to a modelling processor 221, which includes a local store 223. The modelling processor 221 receives the distortion probability map and determines a function, which best fits, the map of distortion vectors of each image frame. For example, a mean square error technique or a spline fitting technique may be used to form the modelling function from the distortion vectors of each image block. The modelling function identified by the modelling processor 221 is stored in the local data store 223 for forming the next up-date of the modelling function. The modelling function is then fed to the image analyser 200, ready for receipt of the next image frame. When the next image frame is received the image is re-sampled within the image analyser 200 in accordance with the modelling function to remove the distortion according to the modelling function. Thus for each iteration a further refinement in the distortion model is produced to the effect of decreasing distortion to subsequent image frames. For the current image frame the watermarked image W'' is output after re-sampling from the image analyser 200. As such the distortion modelling function which is calculated for a current watermarked image frame W'' is applied to reduce distortion from a subsequent water marked image frame. However, typically distortion of the water marked image is changing relatively slowly with respect to a time between successive frames. Therefore a modelling function for a current image frame can be applied to a subsequent image frame without a significant reduction in a likelihood of correctly recovering a code word from a water marked image. The re-sampling can be performed contemporaneously with the calculation of the modelling function for the current image frame.

Summary of Operation

Figure 10:
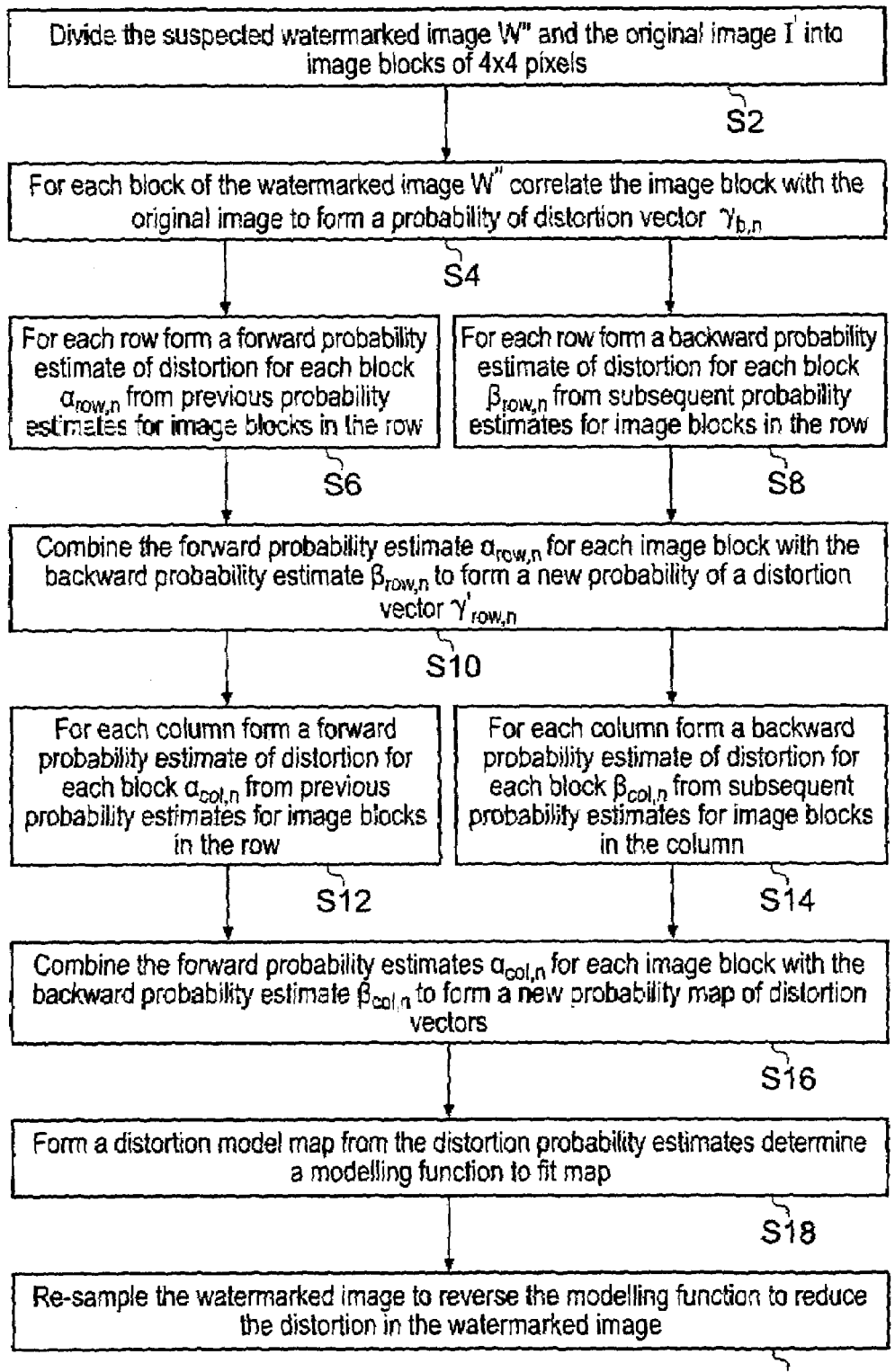
FIG. 10 is a flow diagram illustrating the operation of the registration processor summarising the present technique.

FIG. 10 provides a flow diagram summarising the operation of the registration processor 104 shown in FIGS. 3, 5, 6 and 7. Process steps illustrated in FIG. 10 are summarised as follows:

S2: The suspected water marked image W'' and the copy of the original image I' are received by the registration processor 104. A frame of the water marked image W'' is received within a image analyser 200 and divided into image blocks comprising 4×4 pixels.

S4: For each image block within a frame of the water marked image W'', the image block is correlated with the original image to generate an observed distribution of distortion vectors $\gamma_{b,n}$.

S6: For each image block in each row of image blocks, a forward probability distortion vector estimate $\alpha_{b,n}$ is formed recursively from previous estimated forward probability distortion vector estimates $\alpha_{b,n-m}$ in the row multiplied with the observed probability distribution of distortion vectors for the current image blocks.

S8: For each image block in each row of image blocks, a backward probability distortion vector estimate $\delta_{b,n}$ is formed recursively from subsequent estimated backward probability distortion vector estimates $\beta_{b,n+m}$ moving backwards along the row multiplied with the observed probability distribution of distortion vectors for the current image blocks.

S10: A new most likely distortion vector probability estimate $\gamma_{b,n}'$ is generated for each image block by combining the forward probability estimate $\alpha_{b,n}$, the backward probability estimate $\beta_{b,n}$ and the estimated distortion vector $\gamma_{b,n}$. At this stage, in some embodiments the most likely distortion probability estimate could be used to form a distortion map, from which a modelling function could be produced for removing the distortion from the watermarked image. However, in other embodiments process steps S12, S14, S16 are performed following a different predetermined pattern through the image blocks of the image frame to generate a refined estimate of the most likely distortion vector probability estimates $\gamma_{b,n}''$. For the following example, the different predetermined pattern is a path column-by-column through the image blocks.

S12: For each image block in each column of image blocks in the frame, a forward probability distortion vector estimate $\alpha_{b,n}$ is formed recursively from previous estimated forward probability distortion vector estimates $\alpha_{b-a,n}$ in the column multiplied with the observed probability distribution of distortion vectors for the current image blocks.

S14: For each image block in each column of image blocks in the frame, a backward probability distortion vector estimate $\beta_{b,n}$ is formed recursively from subsequent estimated backward probability distortion vector estimates $\beta_{b+a,n}$ moving backwards along the column multiplied with the observed probability distribution of distortion vectors for the current image blocks.

S16: A refined version of the most likely distortion vector probability estimate is then generated by combining the forward and backward probability distribution of possible distortion vectors, with the previous most likely distortion vector estimate, as for step S10.

S18: A map of distortion vectors is then formed from the most likely distortion vector for each of the image blocks. From the map a modelling function is determined which best fits the map, providing a two-dimensional function representing the distortion of the water marked image W''.

S20: The water marked image W'' is then re-sampled to effect a reverse of the modelling function to substantially reduce the distortion in the water marked image W'', to register the water marked image with the copy of the original image.

Applications

The registration processor according to the present technique, examples of which are described above, can find application in removing distortion from an image, with respect to a copy of the original image. The registration processor may therefore be used according to the present technique for detecting code words which are present in distorted water marked images as herein before described, and in particular to detecting code words which have been embedded in digital cinema images. Furthermore, software which is arranged to perform the method of registering images according to embodiments of the present invention may be included as part of monitoring software for execution on a general-purpose computer, which may be arranged to communicate via a network such as the internet. The monitoring software when executed on the general purpose computer may be arranged to compare a suspected water marked image with a copy of the original image, to register the images and to recover a code word from the water marked image in order to enforce rights in the images by the owner, distributor or other rights holder.

Various further aspects and features of the present invention are defined in the appended claims. Various modifications can be made to the embodiments herein before described without departing from the scope of the present invention.

The invention claimed is:

1. A data processing apparatus for detecting at least one of a set of code words which has been embedded in a water marked version of an image, the apparatus comprising:

a registration processor operable to register the water marked version of the image and an original version of the image with respect to one another; and a detection processor operable to recover an estimate of the at least one of the set of code words from the water marked version of the image by comparing the water marked version of the image with the original version of the image, and to detect the at least one of the set of code words by correlating each of the set of code words with the at least one of the set of code words, wherein
the registration processor includes,
   an image analyser operable to divide a frame of the water marked version of the image into a plurality of image blocks,
   a distortion vector probability estimator operable to estimate for each of the plurality of image blocks of the water marked version of the image an observed probability of possible distortion vectors representing shifts of the image block with respect to positions of the image block in the original version of the image,
   a forward probability estimator operable, for each of the plurality of image blocks, to generate an estimate of a forward probability distribution of the possible distortion vectors within the image block recursively from the observed probability of possible distortion vectors for the image block and forward probability distribution estimates determined from previous image blocks for a predetermined path through the plurality of image blocks,
   a backward probability estimator operable, for each of the plurality of image blocks, to generate an estimate of a backward probability distribution of the possible distortion vectors within the image block recursively from the observed probability of possible distortion vectors for the image block and backward probability distribution estimates determined from subsequent image blocks for a predetermined pattern,
   a combining engine operable to combine for each of the plurality of image blocks, the estimate of the forward probability distribution, the estimate of the backward probability distribution, and the observed probability of possible distortion vectors to form a most likely distortion vector estimate, and to form a map of distortion vectors from the most likely distortion vector estimate for each of the plurality of image blocks, and
   an inverse distortion engine operable to apply a reverse of the map of distortion vectors to register the water marked version of the image with the original version of the image to detect the at least one of the set of code words.

2. The data processing apparatus as claimed in claim 1, wherein the inverse distortion engine comprises:
   a modelling processor operable to generate a modelling function which best fits the map of distortion vectors, the modelling function representing a distortion present in the water marked version of the image; and a re-sampler operable to re-sample the water marked version of the image to register the water marked version of the image with the original version of the image.

3. The data processing apparatus as claimed in claim 2, wherein the re-sampler is operable to re-sample pixels of the water marked version of the image to reverse the distortion according to the modelling function.

4. The data processing apparatus as claimed in claim 1, further comprising:
   a second forward probability estimator operable, for each of the plurality of image blocks, to generate a second estimate of the forward probability distribution of the possible distortion vectors within the image block recursively from the most likely distortion vector estimate for the image block and forward probability distribution estimates determined from previous image blocks for a second predetermined pattern through the plurality of image blocks, the predetermined pattern including a first predetermined pattern and the second predetermined pattern; and
   a second backward probability estimator operable, for each of the plurality of image blocks, to generate a second estimate of the backward probability distribution of the possible distortion vectors within the image block recursively from the most likely distortion vector estimate for the image block and backward probability distribution estimates determined from subsequent image blocks for the second predetermined pattern, wherein
   the combining engine is operable to combine the second estimate of the forward probability distribution with the second estimate of the backward probability distribution and the most likely distortion vector estimate to form a refined distortion probability map providing a refinement of the distortion vectors, and
   the inverse distortion engine being operable to apply a reverse of the refined distortion probability map to register the water marked version of the image with the original version of the image.

5. The data processing apparatus as claimed in claim 4, wherein
   the first predetermined pattern identifies the image blocks for processing row-by-row, and
   the second predetermined pattern identifies the image blocks for processing column-by-column.

6. The data processing apparatus as claimed in claim 4, wherein
   at least one of the forward probability estimator and the second forward probability estimator includes a filter configured to adjust a respective one of the estimate of the forward probability distribution and the second estimate of the forward probability distribution of the possible distortion vectors in accordance with a predetermined probability distribution, effecting a likelihood of the respective one of the estimate of the forward probability distribution and the second estimate of the forward probability distribution occurring, and
   at least one of the backward probability estimator and the second backward probability estimator includes a filter configured to adjust a respective one of the estimate of the backward probability distribution and the second estimate of the backward probability distribution of the possible distortion vectors in accordance with the predetermined probability distribution, effecting a likelihood of the respective one of the estimate of the backward probability distribution and the second estimate of the backward probability distribution occurring.

7. The data processing apparatus as claimed in claim 6, wherein the predetermined probability distribution is a Gaussian distribution.

8. A method for an image processing apparatus of detecting at least one of a set of code words which has been embedded in a water marked version of an image, the method comprising:
   registering, with the image processing apparatus, the water marked version of the image and an original version of the image with respect to one another;
   recovering, with the image processing apparatus, an estimate of the at least one of the set of code words from the water marked version of the image by comparing the water marked version of the image with the original version of the image; and detecting the at least one of the set of code words with the image processing apparatus by correlating each of the set of code words with the at least one of the set of code words, wherein the registering the water marked version of the image and the original version of the image comprises, dividing, with the image processing apparatus, a frame of the water marked version of the image into a plurality of image blocks, estimating, with the image processing apparatus, for each of the plurality of image blocks of the water marked version of the image, an observed probability of possible distortion vectors representing shifts of the image block with respect to positions of the image block in the original version of the image, generating, with the image processing apparatus, for each of the plurality of image blocks, an estimate of a forward probability distribution of the possible distortion vectors within the image block recursively from the observed probability of possible distortion vectors for the image block and forward probability distribution estimates determined from previous image blocks for a predetermined path through the plurality of image blocks, generating, with the image processing apparatus, for each of the plurality of image blocks, an estimate of a backward probability distribution of the possible distortion vectors within the image block recursively from the observed probability of possible distortion vectors for the image block and backward probability distribution estimates determined from subsequent image blocks for a predetermined pattern, combining for each of the plurality of image blocks the estimate of the forward probability distribution, the estimate of the backward probability distribution, and the observed probability of possible distortion vectors with the image processing apparatus to form a most likely distortion vector estimate, forming, with the image processing apparatus, a map of distortion vectors from the most likely distortion vector estimate for each of the plurality of image blocks, and applying, with the image processing apparatus, a reverse of the most likely distortion vector for each of the plurality of image blocks by re-sampling the water marked version of the image to register the water marked version of the image with the original version of the image to detect the at least one of the set of code words.

9. The method as claimed in claim 8, wherein the applying the reverse of the most likely distortion vector comprises:

generating a modelling function which best fits the map of distortion vectors, the modelling function representing a distortion present in the water marked version of the image; and re-sampling the water marked version of the image to register the water marked version of the image with the original version of the image.

10. The method as claimed in claim 9, wherein the re-sampling comprises:

re-sampling pixels of the water marked version of the image to reverse the distortion according to the modelling function.

11. The method as claimed in claim 8, further comprising:

generating for each of the plurality of image blocks a second estimate of the forward probability distribution of the possible distortion vectors within the image block from the most likely distortion vector for the image block and forward probability distribution estimates determined from previous image blocks for a second predetermined pattern through the plurality of image blocks, the predetermined pattern including a first predetermined pattern and the second predetermined pattern;

generating for each of the plurality of image blocks a second estimate of the backward probability distribution of the possible distortion vectors within the image block from the most likely distortion vector for the image block and backward probability distribution estimates determined from subsequent image blocks for the second predetermined pattern;

combining the second estimate of the forward probability distribution with the second estimate of the backward probability distribution and the most likely distortion vector to form a refined distortion probability map providing a refinement of the distortion vectors; and applying a reverse of the refined distortion probability map to register the water marked version of the image with the original version of the image.

12. The method as claimed in claim 11, wherein the first predetermined pattern identifies the image blocks for processing row-by-row, and the second predetermined pattern identifies the image blocks for processing column-by-column.

13. The method as claimed in claim 8, further comprising:

adjusting the estimate of the forward probability distribution in accordance with a predetermined probability distribution, effecting a likelihood of the estimate of the forward probability distribution occurring; and adjusting the backward probability distribution in accordance with the predetermined probability distribution, effecting a likelihood of the estimate of the backward probability distribution occurring.

14. The method as claimed in claim 13, wherein the predetermined probability distribution is a Gaussian distribution.

15. A computer readable medium having recorded thereon a computer program providing computer executable instructions, which when loaded on to a data processor, cause the data processor to perform a method comprising:

registering a water marked version of an image and an original version of the image with respect to one another;

recovering an estimate of at least one of a set of code words embedded in the water marked version of the image by comparing the water marked version of the image with the original version of the image; and detecting the at least one of the set of code words by correlating each of the set of code words with the at least one of the set of code words, wherein the registering the water marked version of the image and the original version of the image includes, dividing a frame of the water marked version of the image into a plurality of image blocks, estimating, with the data processor, for each of the plurality of image blocks of the water marked version of the image, an observed probability of possible distortion vectors representing shifts of the image block with respect to positions of the image block in the original version of the image, generating, with the data processor, for each of the plurality of image blocks, an estimate of a forward probability distribution of the possible distortion vectors within the image block recursively from the observed probability of possible distortion vectors for the image block and forward probability distribution estimates determined from previous image blocks for a predetermined path through the plurality of image blocks, generating, with the data processor, for each of the plurality of image blocks, an estimate of a backward probability distribution of the possible distortion vectors within the image block recursively from the observed probability of possible distortion vectors for the image block and backward probability distribution estimates determined from subsequent image blocks for a predetermined pattern, combining for each of the plurality of image blocks the estimate of the forward probability distribution, the estimate of the backward probability distribution, and the observed probability of possible distortion vectors, with the data processor, to form a most likely distortion vector estimate, forming a map of distortion vectors from the most likely distortion vector estimate for each of the plurality of image blocks, and applying a reverse of the most likely distortion vector for each of the plurality of image blocks by re-sampling the water marked version of the image to register the water marked version of the image with the original version of the image to detect the at least one of the set of code words.

* * * * *